May 20, 1941.   M. T. DUNCAN   2,242,606
DRAFT SHIELD
Filed Nov. 13, 1939
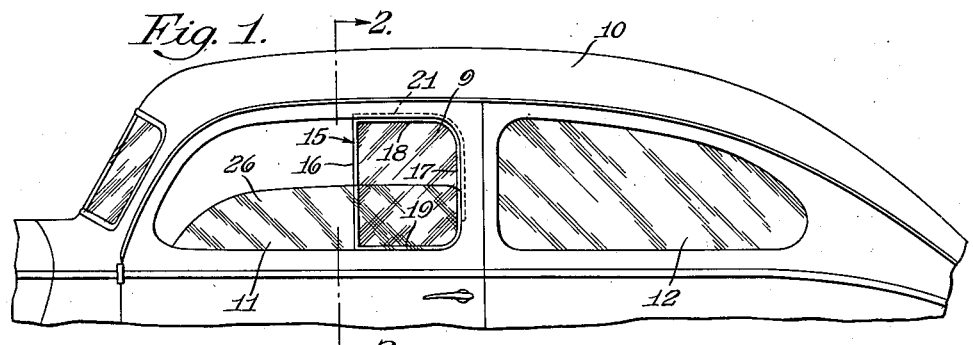
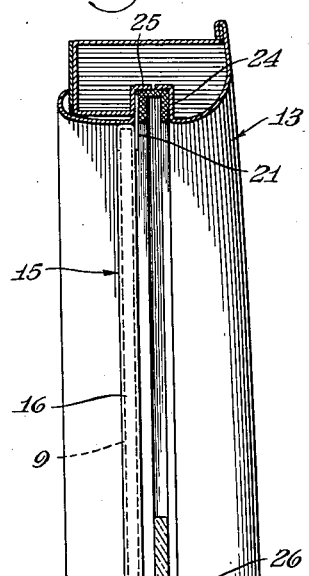
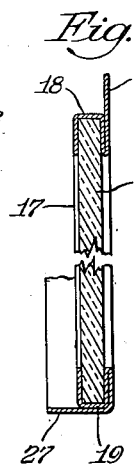
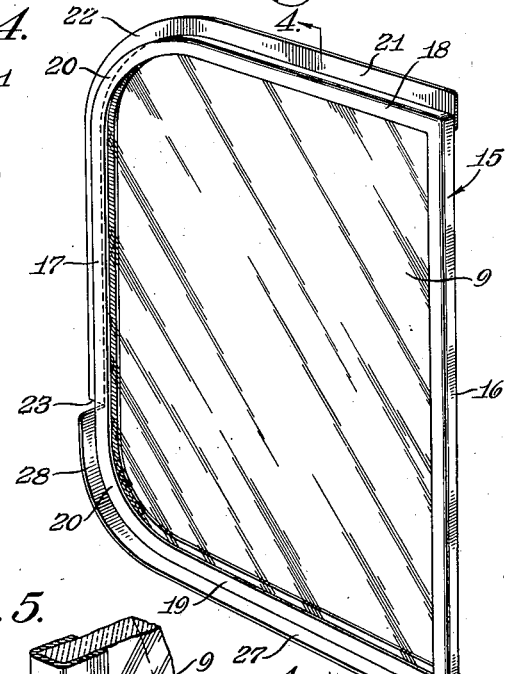
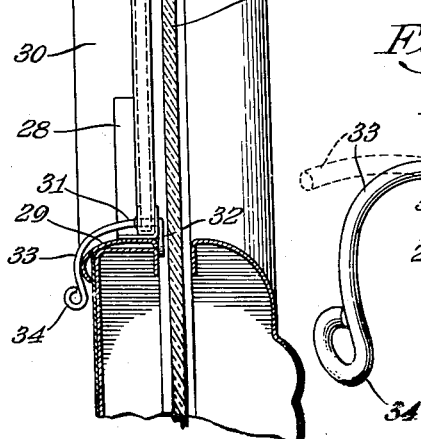
Morris T. Duncan, INVENTOR
BY Victor J. Evans & Co.
ATTORNEYS Patented May 20, 1941

2,242,606

UNITED STATES PATENT OFFICE 2,242,606

DRAFT SHIELD

Morris T. Duncan, El Dorado, Kans.

Application November 13, 1939, Serial No. 304,223

1 Claim. (Cl. 296—44)

This invention relates to draft shields for motor vehicles and has for an object to provide a shield in the nature of a glass pane and a metal frame therefor, adapted to be mounted in the rear portion of a front door window space, and protect the occupants of the rear seat from draft, while at the same time permit raising and lowering of the front window as desired.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a fragmentary side elevation of a motor vehicle equipped with a draft shield constructed in accordance with the invention.

Figure 2 is a vertical sectional view, drawn to large scale, and taken on the line 2—2 of Figure 1.

Figure 3 is a perspective view of the draft shield.

Figure 4 is a detail vertical sectional view showing the frame of the shield.

Figure 5 is a detail perspective view showing the latch for detachably holding the shield in place.

Referring now to the drawing in which like characters of reference designate similar parts in the various views, 10 designates a motor vehicle having front and rear windows 11 and 12 of conventional type. In carrying out the invention a draft shield is provided for application to the rear of the window space in the frame 13 of the front window 11.

The draft shield comprises a frame 15 formed of channel material to receive a transparent glass pane 9 and form a closure for substantially the rear half part of the window space in the front window 11. The frame is provided with a straight front member 16, a straight rear member 17 and straight upper and lower members 18 and 19 rounded at their junctures with the rear member as shown at 20 to conform to the shape of the front window frame 13.

A flange 21 is formed integral with the upper member 18 and extends throughout the length of the member, thence around the curved rear portion thereof as shown at 22 and terminates adjacent the rounded portion 20 at the bottom of the frame as shown at 23. This flange is adapted to be inserted in the socket 24 of the window frame 13 between the inner wall of the socket and the felt cushion strip 25 which receives the front window pane 26 as best shown in Figure 2.

A flange 27 is formed integral with the bottom member 19 and is curved upwardly at the rear curved portion 20 thereof, as shown at 28. The flange is adapted to be supported by the bottom garnish molding 29 of the front window frame as best shown in Figure 2, and the rounded portion 28 thereof extends upwardly along the inner upright member 30 of the window frame to coact with the flange 21 in mounting the draft shield in place.

For securing the draft shield in place a latch is provided comprising a shaft 31 which is journaled in openings formed in the front channel member 16 of the draft shield frame, and is equipped at one end with a head 32 which is adapted to project into the space between the window pane 26 and the lower garnish molding member 29 of the window frame. The shaft is provided at the opposite end with an arcuate integral grip 33 which is adapted to engage with the inner surface of the garnish molding member 29 and coact with the head 32 in holding the draft shield in place. The grip terminates in an eye 34 which may be grasped by the operator to turn the head 32 to operative position or to released position.

As best shown in Figure 4 the frame of the draft shield may be formed from a single blank of sheet metal bent to provide the channel top, bottom and side members, and the flanges 21 and 27.

From the above description it is thought that the construction and operation of the invention will be fully understood without further explanation.

What is claimed is:

A draft shield for motor vehicle windows comprising, a frame, a glass pane in the frame, the frame being formed of channel members including an upper member, a lower member and front and rear members, a flange projecting from the upper member and extending downwardly on the rear member adapted to be received in the window pane receiving groove of the motor vehicle window frame, a flange projecting laterally from the lower member and projecting upwardly on the rear member adapted to be supported on the vehicle window sill and rear portion of the vehicle window frame, a shaft rotatably mounted in the lower channel member of the draft shield frame, a head on one end of the shaft adapted to engage the lower portion of the vehicle window sill inside of the vehicle window pane, and a curved grip on the other end of the shaft adapted to engage the inner surface of the sill of the window frame and co-act with the head in removably securing the draft shield in place so as not to interfere with the raising and lowering of the window pane.

MORRIS T. DUNCAN.